United States Patent
Watanabe et al.

(10) Patent No.: US 11,946,777 B2
(45) Date of Patent: Apr. 2, 2024

(54) POSITION DETECTION DEVICE AND METHOD FOR IMPROVING ACCURACY OF POSITION DETECTION

(71) Applicant: AKEBONO BRAKE INDUSTRY CO., LTD., Tokyo (JP)

(72) Inventors: Haruhito Watanabe, Tokyo (JP); Toru Ikeuchi, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 17/842,950

(22) Filed: Jun. 17, 2022

(65) Prior Publication Data

US 2022/0404173 A1 Dec. 22, 2022

(30) Foreign Application Priority Data

Jun. 18, 2021 (JP) ................................ 2021-101825

(51) Int. Cl.
*G01D 5/20* (2006.01)
*G01B 7/00* (2006.01)

(52) U.S. Cl.
CPC ........... *G01D 5/2046* (2013.01); *G01B 7/003* (2013.01)

(58) Field of Classification Search
CPC ...... G01D 5/2046; G01D 5/2013; G01D 5/20; G01B 7/003; G01B 7/00
See application file for complete search history.

(56) References Cited

U.S. PATENT DOCUMENTS

| | | | | |
|---|---|---|---|---|
| 5,712,563 A | * | 1/1998 | Kawagoe | G01L 5/221 324/207.16 |
| 6,204,659 B1 | * | 3/2001 | Yamamoto | G01B 7/026 324/207.16 |
| 6,512,360 B1 | * | 1/2003 | Goto | F15B 15/2853 324/120 |
| 2006/0164075 A1 | * | 7/2006 | Niwa | G01D 5/2013 324/207.16 |
| 2009/0091314 A1 | * | 4/2009 | Karenowska | G01D 5/20 324/207.16 |

FOREIGN PATENT DOCUMENTS

JP S62-133167 U 8/1987

* cited by examiner

*Primary Examiner* — Jermele M Hollington
*Assistant Examiner* — Suresh K Rajaputra
(74) *Attorney, Agent, or Firm* — Faegre Drinker Biddle & Reath LLP

(57) ABSTRACT

A position detection device includes a position sensor including a coil and a magnetic core, and a signal processor. The signal processor generates a rectangular wave voltage applied to the coil, converts a current which flow through the coil by the rectangular wave voltage into a voltage and outputs the voltage, and acquires a voltage measurement value obtained by sampling the output voltage after predetermined time in synchronization with a timing of rising or falling of a waveform of the rectangular wave voltage. The predetermined time is set such that the voltage measurement value is restricted within a range of 40% or more and 99.999% or less with respect to a maximum value of the rectangular wave voltage when the coil is at a position where an inductance of the coil is minimum.

4 Claims, 4 Drawing Sheets

POSITION DETECTION DEVICE AND METHOD FOR IMPROVING ACCURACY OF POSITION DETECTION

CROSS-REFERENCE TO RELATED APPLICATIONS

The disclosure of Japanese Patent Application No. 2021-101825 filed on Jun. 18, 2021, including specification, drawings and claims is incorporated herein by reference in its entirety.

BACKGROUND

The present invention relates to a position detection device and a method for improving accuracy of position detection that are capable of being used for detection of continuous displacement, movement, and the like.

Continuous displacement, movement, and the like can be detected using an electric coil (hereinafter, referred to as a coil) and a magnetic core that is movable inside the coil. That is, when a relative positional relationship between the coil and the magnetic core changes, inductance of the coil changes. Therefore, a position sensor that detects a change in position by measuring the inductance can be implemented.

However, a position sensor having a simple structure using a single coil generally does not have high detection accuracy in a wide range. Therefore, in applications requiring high detection accuracy, a linear variable differential transformer (LVDT) is generally used.

However, since the LVDT includes a plurality of coils, a structure of a sensor becomes complicated, and cost of components and cost of a signal processing circuit tend to be high.

For example, in an application of detecting a wear amount, a movement direction, and the like of a component in a brake device of each wheel on a vehicle, it is necessary to prepare sensors and signal processing circuits by the number of wheels. Therefore, it is desired that highly accurate position detection can be executed by an inexpensive sensor without using the LVDT.

On the other hand, for example, Patent Literature 1 discloses that an inductance measuring device applies a stepped voltage to a coil (measured inductance), starts a timer, measures a current value after t seconds, and calculates a value of the inductance. It is disclosed that a slope of a transient current waveform when a time t is near 0 is obtained as a tangent line, and the inductance is calculated based on the slope. Further, it is disclosed that as a time Δt is smaller, the inductance can be measured with higher accuracy and measurement time is shortened.

Patent Literature 1: Japanese Utility Model Publication No. S62-133167

SUMMARY

According to one advantageous aspect of the invention, there is provided a position detection device including:
a position sensor including a coil and a magnetic core that is movable inside the coil; and
a signal processor configured to output a signal corresponding to a change in a relative position between the coil and the magnetic core, wherein
the signal processor is configured
to generate a rectangular wave voltage applied to the coil,
to convert a current which flow through the coil by the rectangular wave voltage into a voltage and to output the voltage, and
to acquire a voltage measurement value Vs obtained by sampling the output voltage after predetermined time Td in synchronization with a timing t0 of rising or falling of a waveform of the rectangular wave voltage, and
the predetermined time Td is set such that the voltage measurement value Vs is restricted within a range of 40% or more and 99.999% or less with respect to a maximum value of the rectangular wave voltage when the magnetic core is at a position where inductance of the coil is minimum.

The signal processor may further include
a low pass filter configured to detect a direct current component of the voltage measurement value Vs, and
a band pass filter configured to detect an alternating current component of the voltage measurement value Vs.

The signal processor may be configured to convert the voltage measurement value Vs into position information.

According to another advantageous aspect of the invention, there is provided a method for improving accuracy of position detection for measuring, by a position sensor including a coil and a magnetic core that is movable inside the coil, a change in a relative position between the coil and the magnetic core, the method including:
applying a generated rectangular wave voltage to the coil;
detecting a voltage corresponding to a current which flow through the coil by the rectangular wave voltage;
acquiring a voltage measurement value Vs obtained by sampling the detected voltage after a predetermined time Td in synchronization with a timing t0 of rising or falling of a waveform of the rectangular wave voltage; and
setting the predetermined time Td such that the voltage measurement value Vs is restricted within a range of 40% or more and 99.999% or less with respect to a maximum value of the rectangular wave voltage when the magnetic core is at a position where inductance of the coil is minimum.

DETAILED DESCRIPTION OF EXEMPLIFIED EMBODIMENTS

Since a technique in Patent Literature 1 is intended only for inductance measurement, it is highly possible that the technique is not suitable for signal processing in the position sensor as described above. For example, when an outer side of the coil of the position sensor is covered with a metal case for the purpose of protection or the like, the slope of the tangent line of the transient current waveform greatly changes, and thus a large influence appears on a calculation result of the inductance. Depending on the setting of the time t, an influence of a resistor connected in series with the coil may appear, and a large error may occur. Further, it is difficult to solve the error.

The present invention has been made in view of the above-described circumstances, and an object of the present invention is to provide a position detection device and a method for improving accuracy of position detection that are capable of continuously detecting a position with high accuracy over a wide range when a position sensor including a single coil and having a simple configuration is used.

A specific embodiment of the present invention will be described below with reference to the drawings.

Configuration of Position Detection Device

Figure 1:
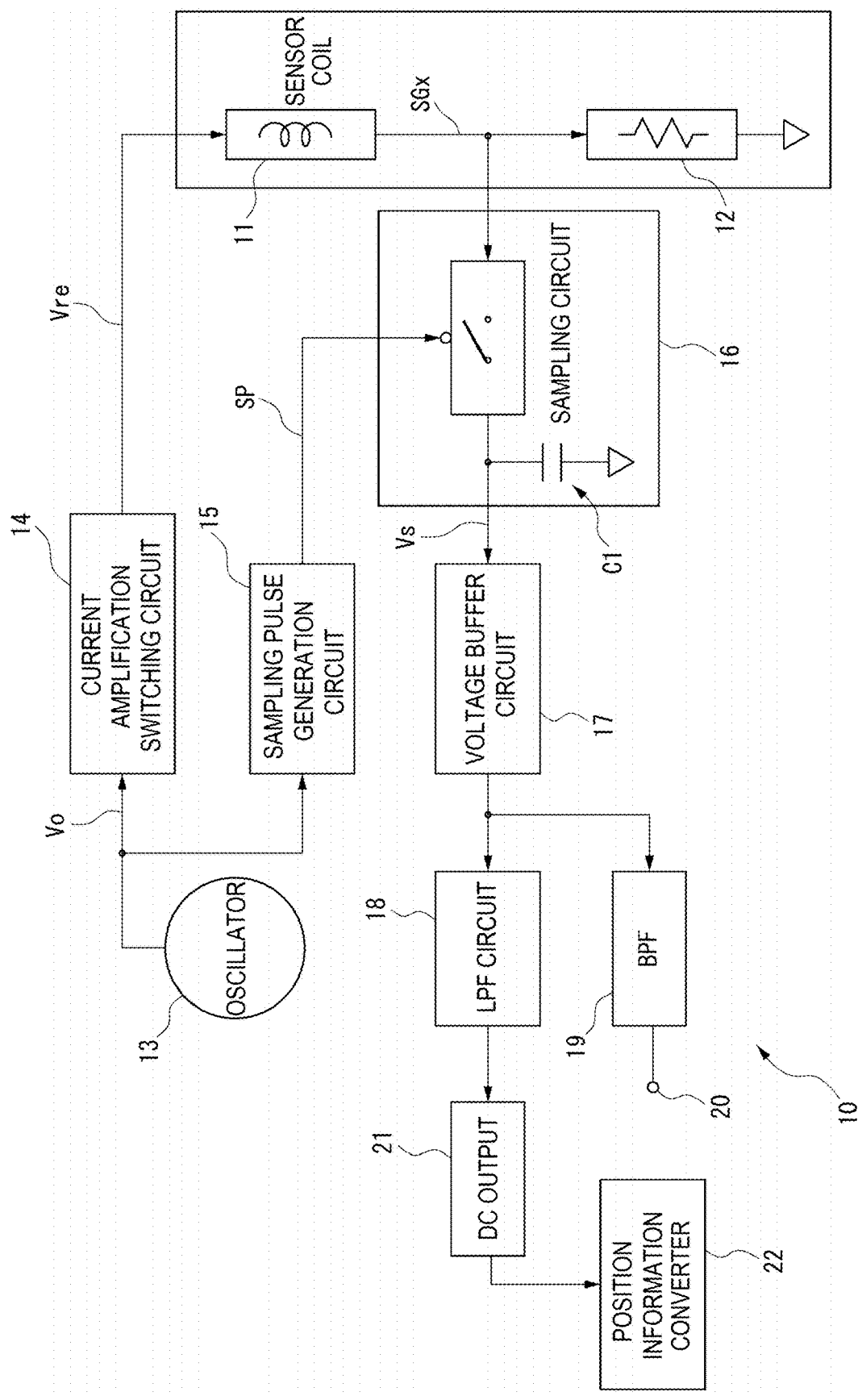
FIG. 1 is a block diagram showing a main part of a position detection device according to an embodiment of the present invention.

FIG. 1 is a block diagram showing a main part of a position detection device according to an embodiment of the present invention.

The position detection device according to the present embodiment includes a position sensor (not shown) and a signal processor 10 shown in FIG. 1. The position sensor includes a sensor coil 11 shown in FIG. 1 and a magnetic core that is provided inside the sensor coil 11 and that is movable in a longitudinal direction of the coil. The magnetic core is formed of, for example, a ferromagnetic material such as iron or ferrite.

Inductance of the sensor coil 11 changes according to a relative position between the sensor coil 11 and the magnetic core. Therefore, for example, when the position sensor is attached to a position where a wear amount in a brake device can be detected, the relative position between the sensor coil 11 and the magnetic core changes according to a change in the wear amount. Therefore, a movement amount according to the wear amount can be detected as the change in the inductance.

The signal processor 10 shown in FIG. 1 includes an oscillator 13, a switching circuit 14, a sampling pulse generation circuit 15, a sampling circuit 16, a voltage buffer circuit 17, a low pass filter (LPF) 18, a band pass filter (BPF) 19, and a position information converter 22. The signal processor 10 may be a circuit board in which these components are mounted or a CPU capable of performing as these components.

Each component of the signal processor 10 can be implemented using any of an analog electric circuit in which individual electric components are combined, a digital electric circuit, or an electronic circuit in which hardware and software of a microcomputer are combined.

The oscillator 13 is configured to generate a stable reference signal Vo having a constant frequency. The reference signal Vo is a binary signal of a rectangular wave, and an on and off duty is, for example, 50%.

The switching circuit 14 is configured to perform current amplification on the reference signal Vo to generate a rectangular wave signal Vre. Therefore, timings of a waveform, a cycle, a duty, and the like of the rectangular wave signal Vre is the same as that of the reference signal Vo. A voltage of the rectangular wave signal Vre becomes, for example, 5 [V] when the rectangular wave signal Vre is on, and becomes substantially 0 [V] when the rectangular wave signal Vre is off.

The rectangular wave signal Vre generated by the switching circuit 14 is applied to the sensor coil 11, and a current ic flows through the sensor coil 11. In order to enable detection of the current ic as a voltage, a resistor 12 is connected in series with the sensor coil 11. That is, a voltage corresponding to a product of a resistance value of the resistor 12 and the current ic is obtained as a detection signal SGx. A value of the resistor 12 is set to a value sufficiently (for example, five times or more) larger than an internal series resistance value of the sensor coil 11.

The sampling pulse generation circuit 15 is configured to generate a sampling pulse signal SP based on the reference signal Vo output from the oscillator 13. Therefore, timings of the sampling pulse signal SP and the rectangular wave signal Vre are synchronized with each other.

Actually, the sampling pulse generation circuit 15 generates a pulse having a fairly small time width as the sampling pulse signal SP after constant delay time Td from a timing at which the rectangular wave signal Vre rises from off to on. Alternatively, the sampling pulse generation circuit 15 generates a pulse of the sampling pulse signal SP after the constant delay time Td from a timing at which the rectangular wave signal Vre falls from ON to OFF.

The sampling circuit 16 is configured to sample a voltage of the detection signal SGx received from an output of the sensor coil 11 to the sampling circuit 16 at a timing when the pulse of the sampling pulse signal SP is generated, and hold an instantaneous value of the voltage by a capacitor C1.

Therefore, a voltage measurement value Vs sampled by the sampling circuit 16 is obtained at an output of the sampling circuit 16. The voltage measurement value Vs is updated by a sampling operation of the sampling circuit 16 when a next pulse appears in the sampling pulse signal SP. This sampling operation is repeated at the same constant cycle as the reference signal Vo.

Since the voltage buffer circuit 17 includes a high impedance input circuit and almost no input current flows, the voltage buffer circuit 17 has almost no influence on the voltage measurement value Vs. Then, the voltage buffer circuit 17 outputs the same signal as the voltage measurement value Vs.

The low pass filter 18 is configured to extract a voltage of a direct current component from the voltage measurement value Vs appearing at the output of the voltage buffer circuit 17, and provides the extracted voltage as a direct current (DC) output 21 to an input of the position information converter 22. That is, a direct current voltage corresponding to the relative position between the sensor coil 11 of the position sensor and the magnetic core is obtained as the direct current output 21.

The band pass filter 19 is configured to extract an alternating current component having a relatively low frequency other than noise from the voltage measurement value Vs appearing at the output of the voltage buffer circuit 17, and output a voltage thereof to an alternating current output 20. For example, when movement, vibration, or the like occurs at a detection target part of a position sensor, time-series variation occurs in the voltage measurement value Vs, and thus the variation is extracted by the band pass filter 19 and appears in the alternating current output 20. Therefore, presence or absence of movement in the detection target part and a movement direction can be measured based on the voltage of the alternating current output 20.

The position information converter 22 is configured to convert a voltage of the direct current output 21 into position information and a movement amount and output the position information and the movement amount. When an error caused by unique characteristics of the actually used position sensor or a usage environment of the case or the like occurs, processing for correcting the error is performed.

Specific Example of Signal

Figure 2:
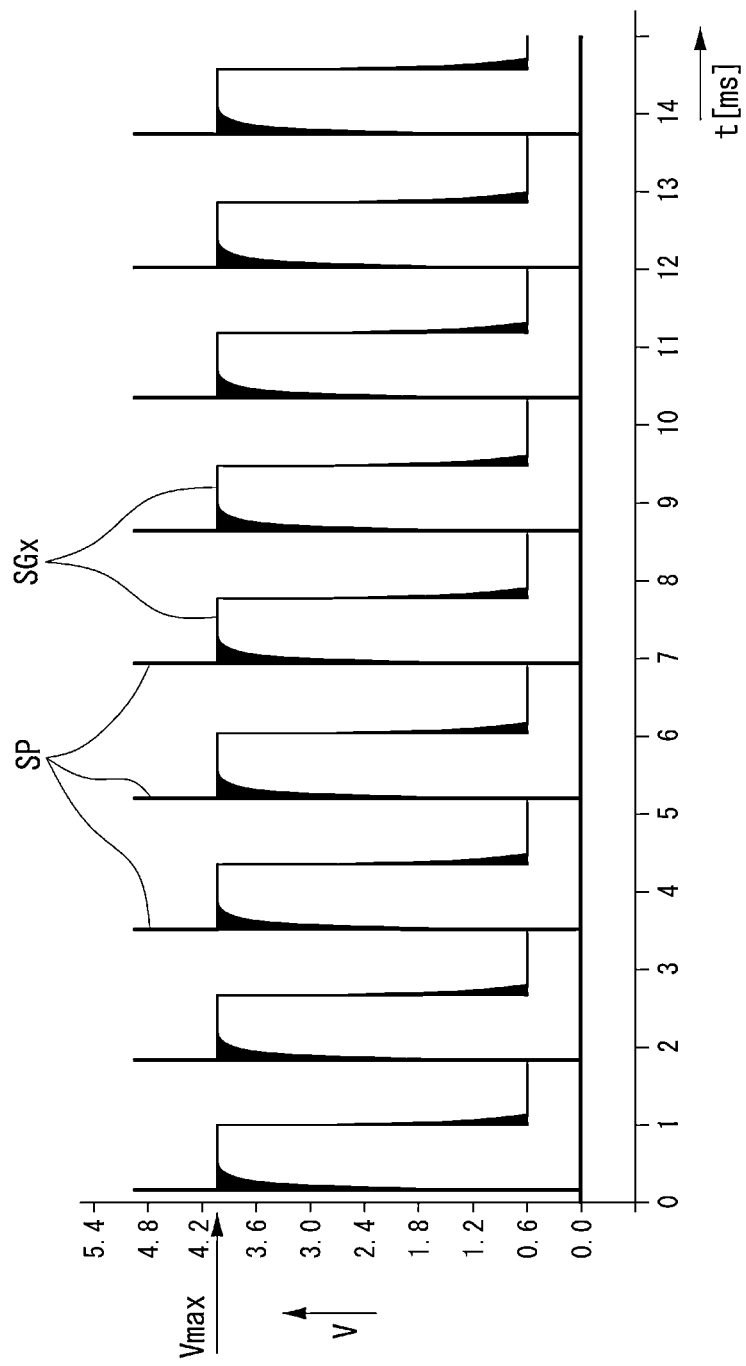
FIG. 2 is a timing chart showing an example of a main signal in a circuit in FIG. 1.
Figure 3:
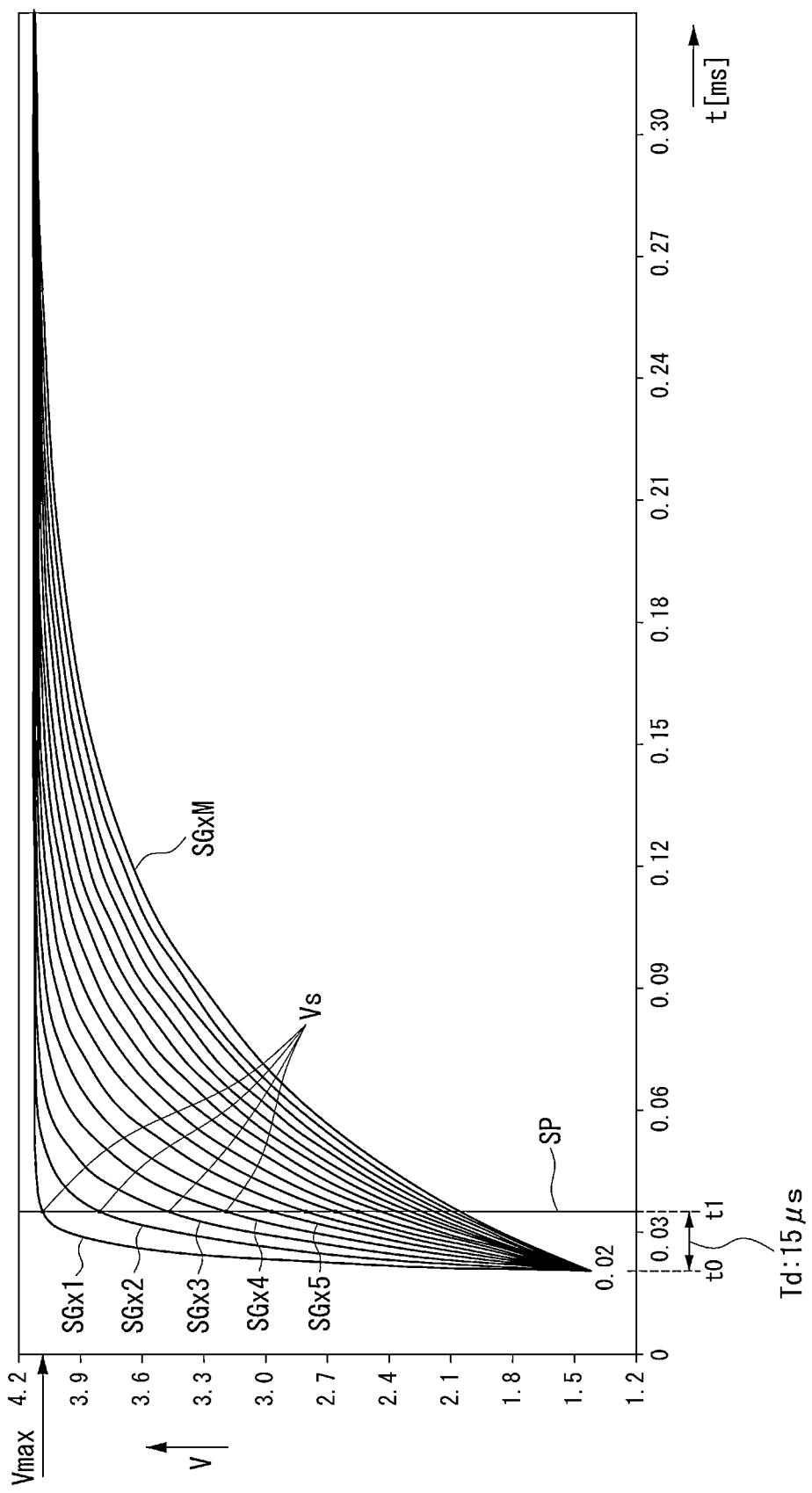
FIG. 3 is a timing chart showing a state in which a time axis in FIG. 2 is enlarged.

FIG. 2 is a timing chart showing an example of a main signal in the signal processor 10 in FIG. 1. FIG. 3 is a timing chart showing a state in which a time axis in FIG. 2 is enlarged. In FIGS. 2 and 3, a horizontal axis represents time t [ms], and a vertical axis represents a voltage [V] of each signal.

As shown in FIG. 2, the detection signal SGx has a shape close to a rectangular wave in which a state of a low voltage of approximately 0.6 [V] and a state of a high voltage of approximately 4.0 [V] are alternately repeated, and a repetition period is approximately 1.7 [ms].

Actually, a waveform of the detection signal SGx is gentler in rising and falling of the waveform as compared with that of the rectangular wave signal Vre by an amount of a transient response corresponding to a time constant determined by the inductance in the sensor coil 11, an internal resistance of the sensor coil 11, and the resistor 12. That is, the inductance of the sensor coil 11 corresponding to a detection position of the position sensor is reflected as a change in the rising and falling waveform of the detection signal SGx.

FIGS. 2 and 3 show a state in which the waveforms of the detection signals SGx in a plurality of types of states are synthesized and superimposed. In the plurality of types of states, the detection positions of the sensor coil 11 and the inductance of the sensor coil 11 are different from one another. That is, the detection signals SGx1, SGx2, SGx3, . . . , and SGxM shown in FIG. 3 indicate the detection signals SGx in a state in which the inductance is different from one another. The detection signal SGx1 represents a waveform when the inductance is the minimum, and the detection signal SGxM represents a waveform when the inductance is the maximum.

On the other hand, a timing when the pulse of the sampling pulse signal SP is generated is synchronized with on and off of the waveform of the rectangular wave signal Vre, and the pulse of the sampling pulse signal SP appears at a time point t1 when certain delay time Td has elapsed from a time point t0. At the time point t0, the waveform of the detection signal SGx rises as shown in FIG. 3. Then, at the time point t1, the voltage of the detection signal SGx is sampled as the voltage measurement value Vs by the sampling circuit 16. In other words, the voltage measurement value Vs is obtained by sampling the output voltage of the resistor 12 on a time that the delay time Td has elapsed from a time point t0 at which the wave form of the rectangular wave signal Vre rises. In an example in FIG. 3, the delay time Td is set to 15 [μs].

Therefore, when the waveform changes according to the inductance of the sensor coil 11 as the detection signals SGx1 to SGxM shown in FIG. 3, the voltage measurement value Vs sampled at the time point t1 of the sampling pulse signal changes according to the waveform. That is, the detection position of the position sensor and the inductance of the sensor coil 11 are reflected in the voltage measurement value Vs.

Therefore, the detection position of the position sensor can be measured based on the voltage of the direct current output 21 of the signal processor 10 shown in FIG. 1. It is possible to measure presence or absence of movement and a movement direction at a position detected by the position sensor based on the voltage of the alternating current output 20. An absolute position of a core can be determined based on the output voltage value of the direct current output 21. Which direction the core moves can also be determined based on whether the voltage shifts to a higher output voltage of the direct current output 21 or to a lower output voltage of the direct current output 21.

Specific Example of Characteristics of Position Detection Device

Figure 4:
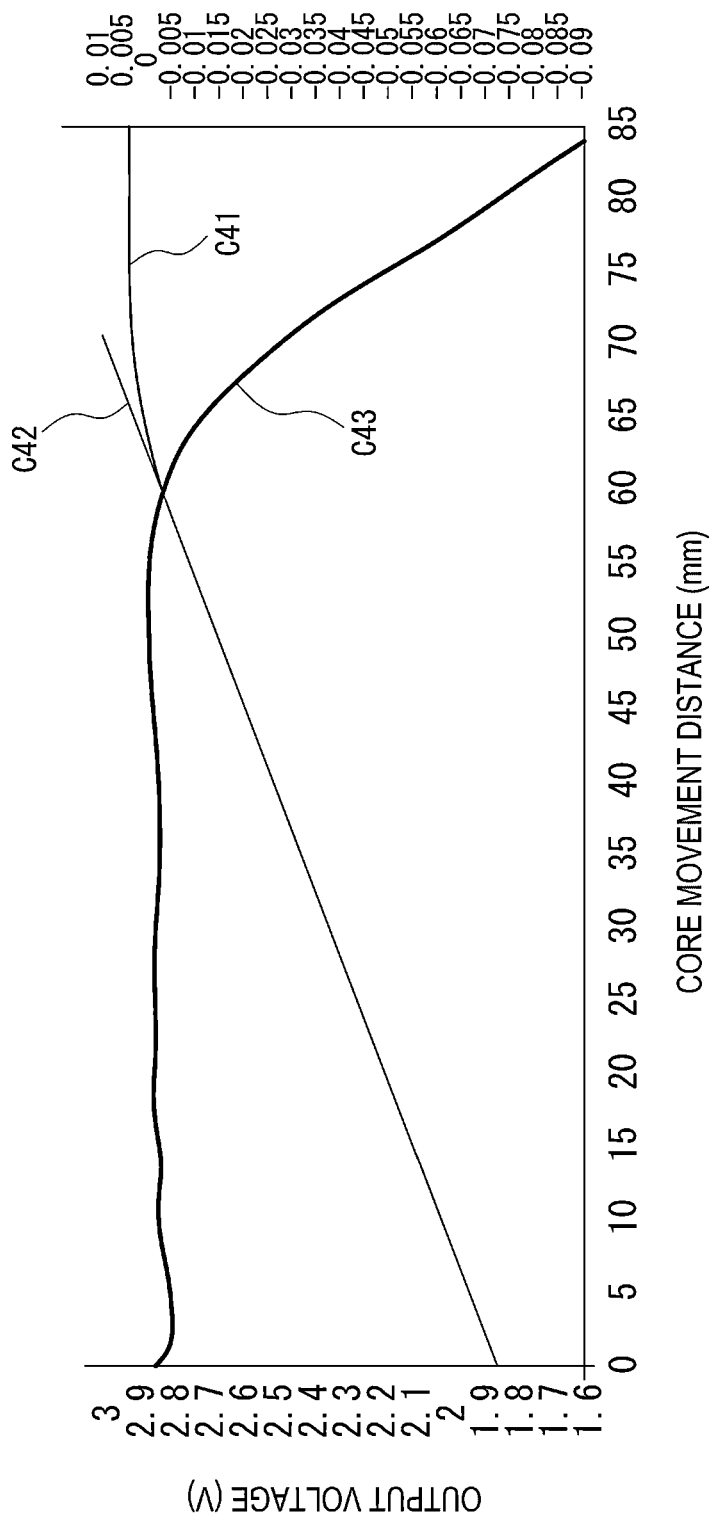
FIG. 4 is a graph showing an example of actual measurement characteristics of the position detection device according to the embodiment of the present invention.

FIG. 4 is a graph showing an example of actual measurement characteristics of the position detection device according to the embodiment of the present invention.

In FIG. 4, a horizontal axis represents a movement distance [mm] of the magnetic core with respect to the sensor coil 11 of the position sensor. A vertical axis in FIG. 4 represents a voltage [V] and an error.

A measured value curve C41 shown in FIG. 4 represents a measured value detected by the direct current output 21 of the signal processor 10. An error characteristic curve C43 represents an error between the measured value of each position of the measured value curve C41 and an ideal straight line C42.

As shown in FIG. 4, the position detection device has good linearity detection characteristics over a wide range. In particular, when the movement distance of the magnetic core is in a range of 0 [mm] to 65 [mm], the measured value curve C41 and the ideal straight line C42 substantially overlap with each other, and the error is within ±1%. Therefore, highly accurate position detection can be achieved by a simple device that uses a position sensor having a simple structure.

Restriction of Delay Time Td

However, if the delay time Td is not appropriate, a detection error of the position detection device may increase. For example, when the delay time Td is too large, at the time point t1 when the waveform of the detection signal SGx1 having the minimum inductance shown in FIG. 3 is sampled, the voltage of the detection signal SGx1 approaches the maximum voltage value Vmax which is a saturation point. Therefore, a change in voltage becomes small and the error increases. Therefore, an upper limit of the delay time Td is set such that the voltage measurement value Vs obtained by sampling the voltage of the detection signal SGx1 is restricted within 99.999% of the maximum voltage value Vmax when the sensor coil 11 is at a position where the inductance of the sensor coil 11 is minimum.

On the other hand, when the delay time Td is too small, at the time point t1 when the waveform of the detection signal SGx1 having the minimum inductance shown in FIG. 3 is sampled, a voltage change (a slope) of the detection signal SGx1 is steep. Therefore, a slight time lag may cause a large change in the voltage measurement value Vs, and the detection error of the position detection device may increase. Therefore, a lower limit of the delay time Td is set such that the voltage measurement value Vs obtained by sampling the voltage of the detection signal SGx1 is restricted to 40% or more of the maximum voltage value Vmax when the magnetic core is at the position where the inductance of the sensor coil 11 is minimum.

In the position detection device having the configuration as the signal processor 10 shown in FIG. 1, it is not necessary to use a sensor such as the LVDT, and highly accurate position detection can be executed according to a simple method using the position sensor including only one coil. In particular, the detection error can be reduced by restricting the lower limit and the upper limit of the delay time Td. The sensor unit also has a major feature of including components that are a solenoid coil, an iron core, and an iron case, that are only passive components, and that have extremely high environmental performance even in terms of a temperature and vibration.

FIGS. 2 and 3 illustrate a case in which the voltage measurement value Vs is obtained by executing sampling with the sampling pulse signal SP in a rising section of the waveform of the detection signal SGx, and it is possible to detect a position with high accuracy even when the voltage measurement value Vs obtained by executing sampling in a falling section of the waveform of the detection signal SGx is used.

Here, characteristics of the position detection device and the method for improving accuracy of position detection according to the embodiment of the present invention described above will be briefly summarized and listed in the following [1] to [4].

[1] A position detection device including:
a position sensor including a coil (the sensor coil 11) and a magnetic core that is movable inside the coil; and
a signal processor (10) configured to output a signal corresponding to a change in a relative position between the coil and the magnetic core, wherein
the signal processor (10) is configured
to generate a rectangular wave voltage applied to the coil, by the switching circuit 14;
to convert a current which flow through the coil by the rectangular wave voltage into a voltage to output the voltage, by the resistor 12; and
to acquire a voltage measurement value Vs obtained by sampling the output voltage (the detection signal SGx) after predetermined time Td in synchronization with a timing t0 of rising or falling of a waveform of the rectangular wave voltage, and
the predetermined time Td is set such that the voltage measurement value Vs is restricted within a range of 40% or more and 99.999% or less with respect to a maximum value (the maximum voltage value Vmax) of the rectangular wave voltage when the magnetic core is at a position where inductance of the coil is minimum (when a detection signal SGx1 is detected).

[2] The position detection device according to [1], wherein the signal processor further includes
a low pass filter (18) configured to detect a direct current component of the voltage measurement value Vs; and
a band pass filter (19) configured to detect an alternating current component of the voltage measurement value Vs.

[3] The position detection device according to [1] or [2], wherein
the signal processor is configured to convert the voltage measurement value Vs into position information.

[4] A method for improving accuracy of position detection for measuring, by a position sensor including a coil (the sensor coil 11) and a magnetic core that is movable inside the coil, a change in a relative position between the coil and the magnetic core, the method including:
applying a generated rectangular wave voltage (the rectangular wave signal Vre) to the coil;
detecting a voltage (the detection signal SGx) corresponding to a current which flow through the coil by the rectangular wave voltage;
acquiring a voltage measurement value Vs obtained by sampling the detected voltage after a predetermined time Td in synchronization with a timing t0 of rising or falling of a waveform of the rectangular wave voltage; and
setting the predetermined time Td such that the voltage measurement value Vs is restricted within a range of 40% or more and 99.999% or less with respect to a maximum value (the maximum voltage value Vmax) of the rectangular wave voltage when the magnetic core is at a position where inductance of the coil is minimum (when the detection signal SGx1 is detected).

According to the position detection device having a configuration in the above-described [1], the position information having a small nonlinear error can be measured based on the voltage measurement value Vs using a position sensor that has a simple configuration including a single coil. In particular, the nonlinear error is likely to occur at the position where the inductance of the coil is minimized. However, the predetermined time Td is set such that the voltage measurement value Vs is restricted within a range of 40% or more and 99.999% or less with respect to the maximum value of the rectangular wave voltage. Accordingly, an increase in error can be avoided.

According to the position detection device having a configuration in the above-described [2], the information of the position detected by the position sensor can be acquired by the low pass filter as the direct current component of the voltage measurement value Vs. Information such as presence or absence of movement and a movement direction that are detected by the position sensor can be acquired by the band pass filter as the alternating current component of the voltage measurement value Vs.

According to the position detection device having a configuration in the above-described [3], even when the inductance characteristics of the position sensor are changed due to an influence of a metal case or the like, for example, it is possible to correctly calibrate the position information by providing the position information converter with a function of correcting a change in characteristics.

According to the method for improving accuracy of position detection in a configuration in the above-described [4], it is possible to measure the position information having a small nonlinear error based on the voltage measurement value Vs using a position sensor that has a simple configuration including a single coil (for example, a solenoid coil). In particular, the nonlinear error is likely to occur at the position where the inductance of the coil is minimized. However, the predetermined time Td is set such that the voltage measurement value Vs is restricted within a range of 40% or more and 99.999% or less with respect to the maximum value of the rectangular wave voltage. Accordingly, an increase in error can be avoided.

According to the position detection device and the method for improving accuracy of position detection in the present invention, it is possible to continuously detect a position with high accuracy over a wide range when a position sensor including a single coil (for example, a solenoid coil) and having a simple configuration is used. Therefore, it becomes easy to reduce component cost and the like.

What is claimed is:
1. A position detection device comprising
a position sensor including a coil and a magnetic core that is movable inside the coil; and
a signal processor configured to output a signal corresponding to a change in a relative position between the coil and the magnetic core, wherein
the signal processor is configured
to generate a rectangular wave voltage applied to the coil, to convert a current which flow through the coil by the rectangular wave voltage into a voltage and to output the voltage, and to acquire a voltage measurement value Vs obtained by sampling the output voltage after predetermined time Td in synchronization with a timing t0 of rising or falling of a waveform of the rectangular wave voltage, and the predetermined time Td is set such that the voltage measurement value Vs is restricted within a range of 40% or more and 99.999% or less with respect to a maximum value of the rectangular wave voltage when the magnetic core is at a position where an inductance of the coil is minimum.

2. The position detection device according to claim 1, wherein the signal processor further includes a low pass filter configured to detect a direct current component of the voltage measurement value Vs, and a band pass filter configured to detect an alternating current component of the voltage measurement value Vs.

3. The position detection device according to claim 1, wherein the signal processor is configured to convert the voltage measurement value Vs into position information.

4. A method for improving accuracy of position detection for measuring, by a position sensor including a coil and a magnetic core that is movable inside the coil, a change in a relative position between the coil and the magnetic core, the method comprising:

applying a generated rectangular wave voltage to the coil;

detecting a voltage corresponding to a current which flow through the coil by the rectangular wave voltage;

acquiring a voltage measurement value Vs obtained by sampling the detected voltage after a predetermined time Td in synchronization with a timing t0 of rising or falling of a waveform of the rectangular wave voltage; and setting the predetermined time Td such that the voltage measurement value Vs is restricted within a range of 40% or more and 99.999% or less with respect to a maximum value of the rectangular wave voltage when the magnetic core is at a position where an inductance of the coil is minimum.

\* \* \* \* \*